(12) United States Patent
Saito et al.

(10) Patent No.: US 12,149,806 B2
(45) Date of Patent: Nov. 19, 2024

(54) IMAGE PICKUP APPARATUS THAT CAN SUPPRESS A FOCUS POSITION SHIFT CAUSED BY TEMPERATURE CHANGES

(71) Applicant: CANON KABUSHIKI KAISHA, Tokyo (JP)

(72) Inventors: Nobuyuki Saito, Kanagawa (JP); Kosuke Nozaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 18/064,408

(22) Filed: Dec. 12, 2022

(65) Prior Publication Data

US 2023/0199288 A1 Jun. 22, 2023

(30) Foreign Application Priority Data

Dec. 17, 2021 (JP) ................................. 2021-205128

(51) Int. Cl.
*H04N 23/52* (2023.01)
*H04N 23/54* (2023.01)
*H04N 23/55* (2023.01)

(52) U.S. Cl.
CPC ............. *H04N 23/52* (2023.01); *H04N 23/54* (2023.01); *H04N 23/55* (2023.01)

(58) Field of Classification Search
CPC ......... H04N 23/52; H04N 23/54; H04N 23/55
See application file for complete search history.

(56) References Cited

U.S. PATENT DOCUMENTS

| 9,176,298 | B1 | 11/2015 | Gustafson |
| 9,658,423 | B2 | 5/2017 | Gustafson |
| 10,054,757 | B2 | 8/2018 | Knutsson |
| 11,867,967 | B2 * | 1/2024 | Kim .......................... G02B 9/60 |

(Continued)

FOREIGN PATENT DOCUMENTS

| CN | 105578736 A | 5/2016 |
| JP | 6054720 B2 | 12/2016 |

(Continued)

OTHER PUBLICATIONS

U.S. Appl. No. 18/064,403, filed Dec. 12, 2022 "Lens Apparatus and Image Pickup Apparatus".

(Continued)

*Primary Examiner* — Chiawei Chen
(74) *Attorney, Agent, or Firm* — Cowan, Liebowitz & Latman, P.C.

(57) ABSTRACT

An image pickup apparatus includes a sensor unit, a lens unit and a lens frame, a housing configured to hold the sensor unit and the lens unit, a connecting member that connects the lens frame and the housing, a cover member that covers part of a first lens disposed furthest to the image sensor, and an elastic member disposed between the first lens and the cover member. A thermal expansion coefficient of the connecting member is larger than that of each of the housing and the lens frame. The lens frame includes a first lens holding portion configured to hold the first lens. A connecting position between the connecting member and the lens frame is disposed on the image sensor side of each of a connecting position between the housing and the connecting member and a position of the first lens holding portion.

6 Claims, 4 Drawing Sheets

(56) References Cited

U.S. PATENT DOCUMENTS

| | | |
|---|---|---|
| 11,966,040 B2 | 4/2024 | Ofir |
| 2009/0237537 A1 | 9/2009 | Maruyama |
| 2013/0093948 A1 | 4/2013 | Takeshita |
| 2014/0104479 A1 | 4/2014 | Samuels |
| 2014/0307162 A1 | 10/2014 | Li |
| 2016/0295081 A1 | 10/2016 | Graff |
| 2017/0042058 A1 | 2/2017 | Pope |
| 2017/0129418 A1 | 5/2017 | Koshiba |
| 2017/0276895 A1 | 9/2017 | Sakuma et al. |
| 2018/0107099 A1 | 4/2018 | Yasuda |
| 2018/0234594 A1* | 8/2018 | Lim .................. H04N 23/50 |
| 2018/0241917 A1 | 8/2018 | Zhang |
| 2019/0349507 A1 | 11/2019 | Lee |
| 2019/0373142 A1 | 12/2019 | Fujiwara |
| 2020/0033549 A1* | 1/2020 | Liu .................. G03B 13/32 |
| 2020/0049932 A1 | 2/2020 | Wei |
| 2021/0302805 A1* | 9/2021 | Yoshida .................. G02B 7/025 |
| 2021/0397072 A1 | 12/2021 | Ding |
| 2022/0059266 A1* | 2/2022 | Saito .................. H01F 41/041 |
| 2022/0196963 A1* | 6/2022 | Suginome .................. G02B 7/021 |
| 2022/0357551 A1* | 11/2022 | Liu .................. G03B 13/32 |
| 2023/0098815 A1 | 3/2023 | Cho |
| 2023/0152576 A1 | 5/2023 | Nozaki |
| 2023/0194827 A1 | 6/2023 | Shuhei |
| 2023/0199288 A1 | 6/2023 | Saito |
| 2023/0199289 A1 | 6/2023 | Suzuki |
| 2023/0213839 A1* | 7/2023 | Watanabe .................. G03B 17/02 396/25 |
| 2023/0244128 A1 | 8/2023 | Van Den Brink |
| 2023/0367184 A1* | 11/2023 | Inaba .................. G02B 7/025 |
| 2023/0418020 A1* | 12/2023 | Hwang .................. G02B 7/025 |

FOREIGN PATENT DOCUMENTS

| | | |
|---|---|---|
| JP | 2017-098891 A | 6/2017 |
| JP | 2018-141861 A | 9/2018 |
| JP | 6391122 B2 | 9/2018 |
| JP | 2020-014003 A | 1/2020 |
| JP | 2020-027278 A | 2/2020 |
| JP | 6912530 B2 | 8/2021 |

OTHER PUBLICATIONS

U.S. Appl. No. 18/064,420, filed Dec. 12, 2022 "Image Pickup Apparatus".

U.S. Appl. No. 18/064,425, filed Dec. 12, 2022 "Image Pickup Apparatus".

U.S. Notice of Allowance issued on Jun. 11, 2024, that issued in U.S. Appl. No. 18/064,425.

Jun. 24, 2024 U.S. Office Action, U.S. Appl. No. 18/064,420.

* cited by examiner

IMAGE PICKUP APPARATUS THAT CAN SUPPRESS A FOCUS POSITION SHIFT CAUSED BY TEMPERATURE CHANGES

BACKGROUND

Technical Field

One of the aspects of the disclosure relates to an image pickup apparatus.

Description of the Related Art

Image pickup apparatuses for outdoor environments such as in-vehicle cameras and surveillance cameras are demanded to improve environmental performance such as waterproof performance. Japanese Patent No. ("JP") 6054720 discloses an optical unit that secures the waterproof performance using a sealing member sandwiched between a lens and a fixing portion that fixes the lens in a barrel from an object-side direction.

In order to improve environmental resistance, it is necessary to compensate for back focus changes caused by ambient temperature changes. JP 6391122 discloses an image pickup apparatus that connects an inner portion to which a lens unit is attached and an outer portion having a reference plane that has a fixed positional relationship with an image sensor, through a connecting portion. Thereby, the connecting portion expands and contracts due to the ambient temperature changes, moves the lens unit away from or closer to the image sensor, and compensates for the back focus changes.

However, in the image pickup apparatus disclosed in JP 6391122, the position of the lens unit in the optical axis direction changes as the temperature changes. At this time, as disclosed in JP 6054720, in an attempt to secure the waterproof performance using a sealing member that is sandwiched and crushed between the lens and the fixing portion, a crush amount of the sealing member decreases, and the waterproof performance decreases.

SUMMARY

One of the aspects of the disclosure provides an image pickup apparatus that can suppress a focus position shift caused by temperature changes while securing waterproof performance.

An image pickup apparatus according to one aspect of the disclosure includes a sensor unit including an image sensor, a lens unit including a plurality of lenses and a lens frame that holds the plurality of lenses, a housing configured to hold the sensor unit and the lens unit, a connecting member configured to connect the lens frame and the housing, a cover member configured to cover part of a first lens disposed furthest to the image sensor among the plurality of lenses, and an elastic member disposed between the first lens and the cover member. A thermal expansion coefficient of the connecting member is larger than a thermal expansion coefficient of each of the housing and the lens frame. The lens frame includes a first lens holding portion configured to hold the first lens. A connecting position between the connecting member and the lens frame is disposed on the image sensor side of each of a connecting position between the housing and the connecting member and a position of the first lens holding portion.

An image pickup apparatus according to another aspect of the disclosure includes a sensor unit including an image sensor, a lens unit including a plurality of lenses and a lens frame that holds the plurality of lenses, a housing configured to hold the sensor unit and the lens unit, a connecting member configured to connect the lens frame and the housing, a cover member configured to cover part of a first lens disposed furthest to the image sensor among the plurality of lenses, an elastic member disposed between the first lens and the cover member, and a correction member having an annular shape. The correction member is disposed between the first lens and the elastic member, and contacts the first lens in a whole circumference around an optical axis as a center.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

First Embodiment

Figure 1:
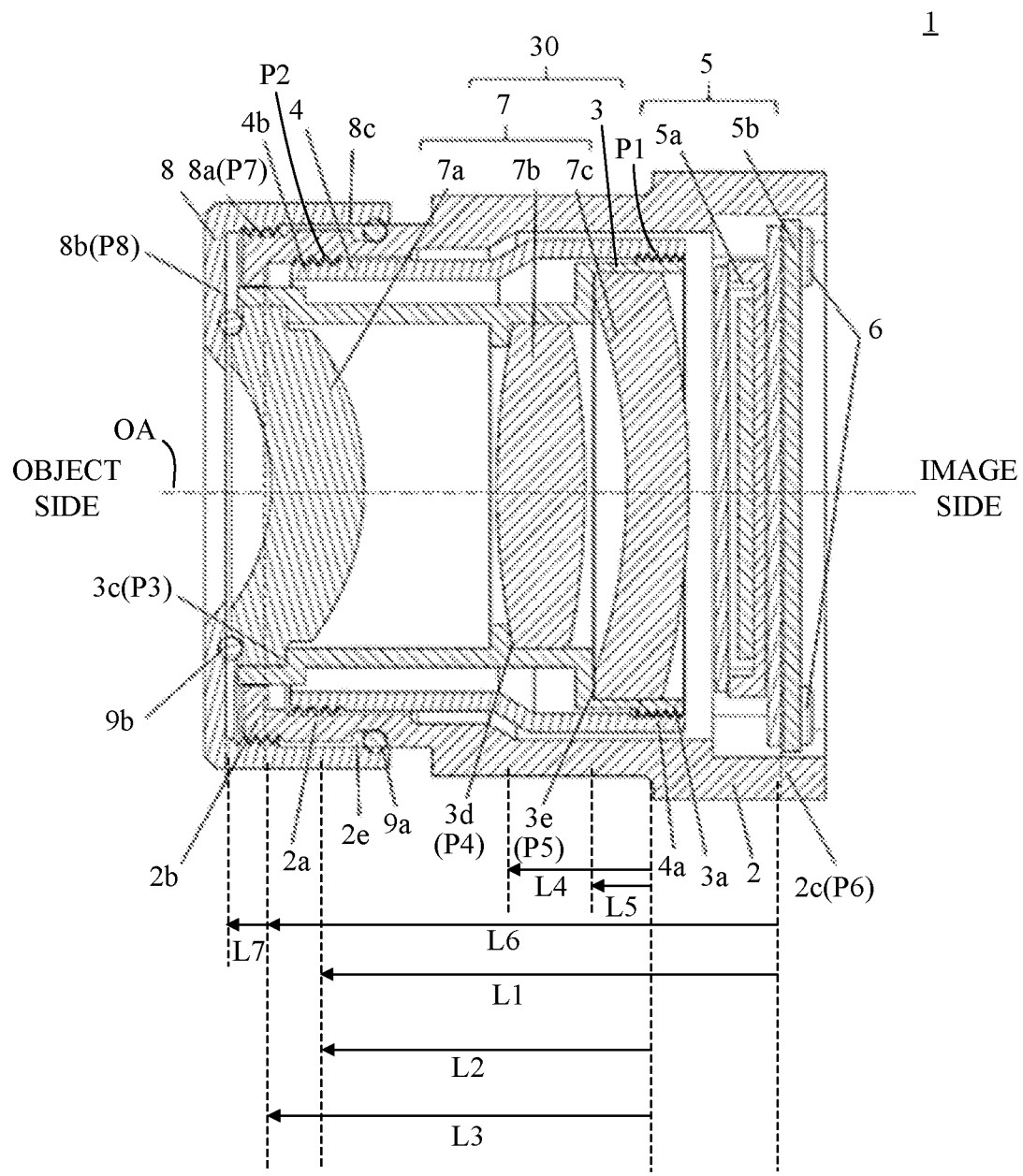
FIG. 1 is a sectional view of an image pickup apparatus according to a first embodiment.
Figure 2B:
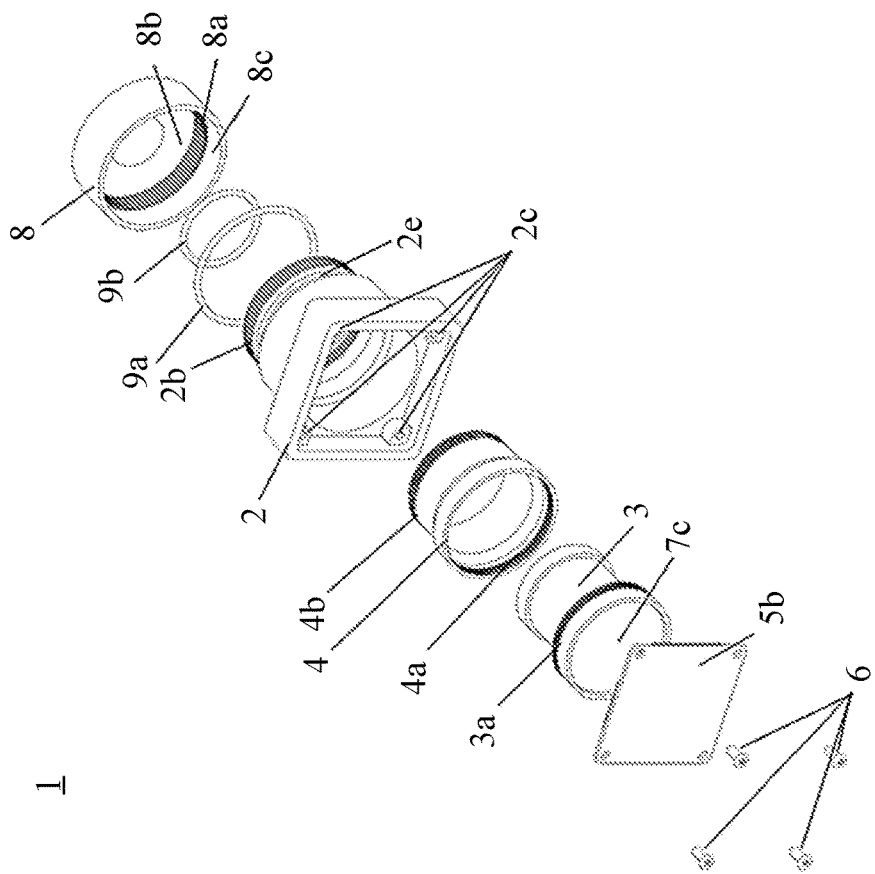
FIGS. 2A and 2B are exploded perspective views of the image pickup apparatus according to the first embodiment.
Figure 2A:
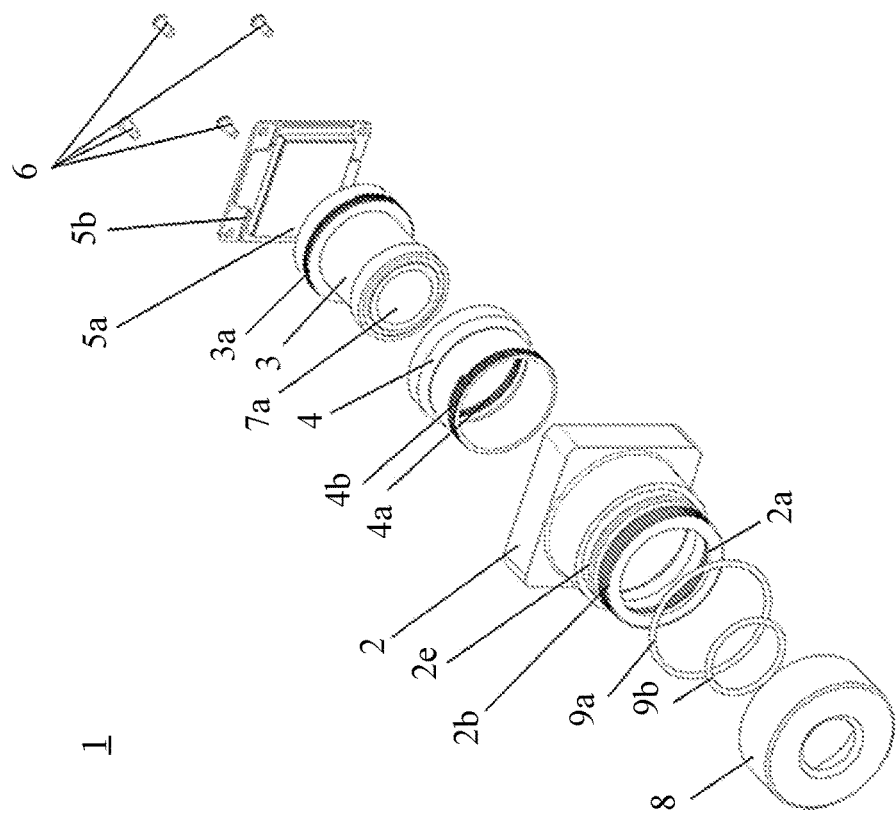

Referring now to FIGS. 1, 2A, and 2B, a description will be given of an image pickup apparatus according to a first embodiment of the disclosure. FIG. 1 is a sectional view of the image pickup apparatus 1 according to this embodiment. FIG. 2A is an exploded perspective view of the image pickup apparatus 1 viewed from the object side, and FIG. 2B is an exploded perspective view of the image pickup apparatus 1 viewed from the image side. The image pickup apparatus 1 according to this embodiment is applicable, but not limited, to an in-vehicle camera, a surveillance camera, a network camera, or the like.

A housing 2 includes an inner diameter threaded portion 2a, an outer diameter threaded portion 2b, and a sensor unit holding portion 2c. A sensor unit 5 includes an image sensor 5a, such as a CMOS sensor, and a sensor plate 5b. The image sensor 5a is held on the sensor plate 5b with a UV adhesive or the like. The sensor unit 5 is attached to the sensor unit holding portion 2c of the housing 2 and fixed to it with screws 6.

A lens unit 30 includes a plurality of lenses 7 that constitute an imaging optical system and a lens frame 3 that holds the plurality of lenses 7, and is disposed inside the housing 2. In this embodiment, the lenses 7 includes, but is not limited to, three lenses, that is, a first lens 7a, a second lens 7b, and a third lens 7c. The first lens 7a is a lens disposed furthest to the image sensor 5a (closest to an object) among the plurality of lenses 7. The lens frame 3 includes an outer diameter threaded portion 3a, a first lens holding portion 3c, a second lens holding portion 3d, and a third lens holding portion 3e. The lenses 7 are held inside the lens frame 3. The first lens 7a is held by and contacts the first lens holding portion 3c. The second lens 7b is held by and contacts the second lens holding portion 3d. The third lens 7c is held by and contacts the third lens holding portion 3e. Thereby, the positions of the first lens 7a, the second lens 7b, and the third lens 7c in the optical axis direction are determined in the lens frame 3.

A connecting portion 4 (connecting member) includes an inner diameter threaded portion 4a and an outer diameter threaded portion 4b. The connecting portion 4 is disposed outside the lens unit 30 and inside the housing 2. The connecting portion 4 is held by (connected to) the housing 2 because the inner diameter threaded portion 2a of the housing 2 and the outer diameter threaded portion 4b of the connecting portion 4 are screwed together. The lens unit 30 is held by (connected to) the connecting portion 4 because the inner diameter threaded portion 4a of the connecting portion 4 and the outer diameter threaded portion 3a of the lens frame 3 are screwed together.

A description will now be given of a waterproof structure of the image pickup apparatus 1. A press ring (cover member) 8 is a flange portion that covers part of the first lens 7a, and includes an inner diameter threaded portion 8a, a contact surface 8b, and an inner diameter portion 8c. A second elastic body (elastic member) 9b is sandwiched between the contact surface 8b of the press ring 8 and the first lens 7a. The contact surface 8b of the press ring 8 contacts the second elastic body 9b. A first elastic body (elastic member) 9a is housed in a groove portion 2e in the housing 2. Each of the first elastic body 9a and the second elastic body 9b is, for example, an O-ring having an annular shape. The first elastic body 9a is housed in the groove portion 2e in the whole circumference around an optical axis OA as a center. The second elastic body 9b contacts the first lens 7a in the whole circumference around the optical axis OA as a center. The inner diameter threaded portion 8a of the press ring 8 and the outer diameter threaded portion 2b of the housing 2 are screwed together while the first elastic body 9a is sandwiched between the inner diameter portion 8c of the press ring 8 and the groove portion 2e in the housing 2. As a consequence, the press ring 8 is held by the housing 2.

Due to this configuration, the first elastic body 9a and the second elastic body 9b are sandwiched in crushed states. As a result, a gap between the press ring 8 and the first lens 7a and a gap between the press ring 8 and the housing 2 are sealed, so that water intrusion into the lens unit 30 and the sensor unit 5 can be prevented. This waterproof structure can secure the waterproof performance without providing a protective window or the like for sealing on the front side (object side) of the first lens 7a. Hence, the image pickup apparatus 1 can be made small.

A description will now be given of focusing in a case where temperature changes in the image pickup apparatus 1. A screwed portion (connecting position P1) between the connecting portion 4 of the image pickup apparatus 1 and the lens frame 3 is disposed on the image side (image sensor side) of each of a screwed portion (connecting position P2) between the housing 2 and the connecting portion 4 and a position P3 of the first lens holding portion 3c for holding the first lens 7a of the lens frame 3. A thermal expansion coefficient of the connecting portion 4 is larger than a thermal expansion coefficient of each of the housing 2 and the lens frame 3.

A description will now be given of a case where the ambient temperature rises as an example. In a case where the temperature of the lenses 7 rises as the ambient temperature rises, characteristic changes such as changes in the refractive indexes of the lenses 7 and thermal deformations of the lenses 7 occur, and the imaging position of the lenses 7 changes away from the image sensor 5a in the object-side direction. In a case where the temperature further rises, the housing 2 thermally expands in the direction extending toward the object side from the sensor unit holding portion 2c as a reference, and similarly the lens frame 3 thermally expands in a direction extending toward the object side from the screwed position between the connecting portion 4 and the lens frame 3 as a reference. Therefore, the imaging position of the lenses 7 changes in the object-side direction away from the image sensor 5a.

On the other hand, in a case where the temperature rises, the connecting portion 4 thermally expands in a direction extending toward the image side from the screwed position between the connecting portion 4 and the housing 2 as a reference.

The operation of the connecting portion 4 can compensate for the displacement of the imaging position that tends to move away from the image sensor 5a in the object-side direction due to the characteristic changes of the lenses 7 and the thermal expansions of the housing 2 and the lens frame 3. Thereby, even if the temperature rises, the imaging position and the position of the image sensor 5a can coincide with each other within a range of the depth of focus, and blur-free good image quality can be maintained.

A description will now be given of a change in the position of the first lens 7a of the image pickup apparatus 1 in a direction along the optical axis OA (optical axis direction) in a case where the temperature changes. In a case where the sensor unit holding portion 2c of the housing 2 is used as a reference, a positional change amount of the first lens 7a in the optical axis direction in a case where the temperature changes is calculated by multiplying a positional change coefficient expressed by the following expression (1) by a temperature change amount.

$$|L1 \times \alpha1 + L3 \times \alpha3 - L2 \times \alpha2| \qquad (1)$$

where L1 is a distance in the optical axis direction from the position of the sensor unit holding portion 2c of the housing 2 to the screwed portion (connecting position P2) between the housing 2 and the connecting portion 4, L2 is a distance in the optical axis direction from the screwed portion (connecting position P1) between the connecting portion 4 and the lens frame 3 to the screwed portion (connecting position P2) between the housing 2 and the connecting portion 4, L3 is a distance in the optical axis direction from the screwed portion (connecting position P1) between the connecting portion 4 and the lens frame 3 to the position P3 of the first lens holding portion 3c of the lens frame 3, $\alpha1$ is a thermal expansion coefficient of the housing 2, $\alpha2$ is a coefficient of thermal expansion of the connecting portion 4, and $\alpha3$ is a coefficient of thermal expansion of the lens frame 3.

The smaller the positional change coefficient calculated by the expression (1) is, the smaller the positional change amount of the first lens 7a in the optical axis direction becomes smaller in a case where the temperature changes. For example, the positional change coefficient expressed by the expression (1) may satisfy 0.1 or less (an inequality $|L1 \times \alpha1 + L3 \times \alpha3 + L2 \times \alpha2| \leq 0.1$ may be satisfied). At this time, the positional change amount of the first lens 7a in the optical axis direction caused by a temperature change by 50° C. becomes 5 μm or less. Thereby, a change amount of the crush amount of the second elastic body 9b caused by the temperature change becomes also 5 μm or less.

Now assume that L4 is a distance in the optical axis direction from the screwed portion (connecting position P1) between the connecting portion 4 and the lens frame 3 to a position P4 of the second lens holding portion 3d of the lens frame 3. L5 is a distance in the optical axis direction from the screwed portion (connecting position P1) between the connecting portion 4 and the lens frame 3 to a position P5 of the third lens holding portion 3e of the lens frame 3. Then, a positional change coefficient of the second lens 7b in the optical axis direction in a case where the temperature changes is expressed by $|L1\times\alpha1+L4\times\alpha3-L2\times\alpha2|$, and a positional change coefficient of the third lens 7c in the optical axis direction in a case where the temperature changes is expressed by $|L1=\alpha1+L5\times\alpha3-L2\times\alpha2|$. Since each of the distances L4 and L5 is smaller than the distance L3 in the image pickup apparatus 1, each of $|L1\times\alpha1+L4\times\alpha3-L2\times\alpha2|$ and $|L1\times\alpha1+L5\times\alpha3-L2\times\alpha2|$ is larger than $|L1\times\alpha1+L3\times\alpha3-L2\times\alpha2|$. Thus, in a case where the temperature changes, the positional change amount of the first lens 7a in the optical axis direction from the position of the sensor unit holding portion 2c as a reference is smaller than the positional change amount of each of the second lens 7b and the third lens 7c (at least one lens excluding the first lens 7a) in the optical axis direction.

An absolute value of the sensitivity of the first lens 7a may be 0.5 or less. Here, the sensitivity corresponds to a ratio of the positional change amount of the first lens 7a in the optical axis direction to the positional change amount of the imaging position in the optical axis direction. For example, in a case where the sensitivity of the first lens 7a is 0.4 and the first lens 7a moves by 1 mm in the optical axis direction, the imaging position of the lenses 7 moves by 0.4 mm in the optical axis direction. The sum of the sensitivities of all the lenses in the lens unit 30 is 1. For example, in a case where the sensitivity of the first lens 7a is 0.4, the sum of the sensitivity of the second lens 7b and the sensitivity of the third lens 7c is 0.6.

Even if the temperature of the first lens 7a changes, its positional change amount in the optical axis direction from the sensor unit holding portion 2c of the housing 2 as a reference is small, and thus the change amount in the imaging position is also small. In a case where the sensitivity of the first lens 7a is high, the total sensitivity of the other lenses is small. Hence, in order to compensate for the focus position caused by the temperature change, the positions of the other lenses must be significantly changed in the optical axis direction and a large space becomes necessary. Accordingly, by setting the sensitivity of the first lens 7a to 0.5 or less, the total sensitivity of the other lenses becomes larger than 0.5. This configuration can reduce the positional change amounts of the lenses other than the first lens 7a in the optical axis direction for focus position compensation in a case where the temperature changes, and the image pickup apparatus 1 can be made small.

Figure 3:
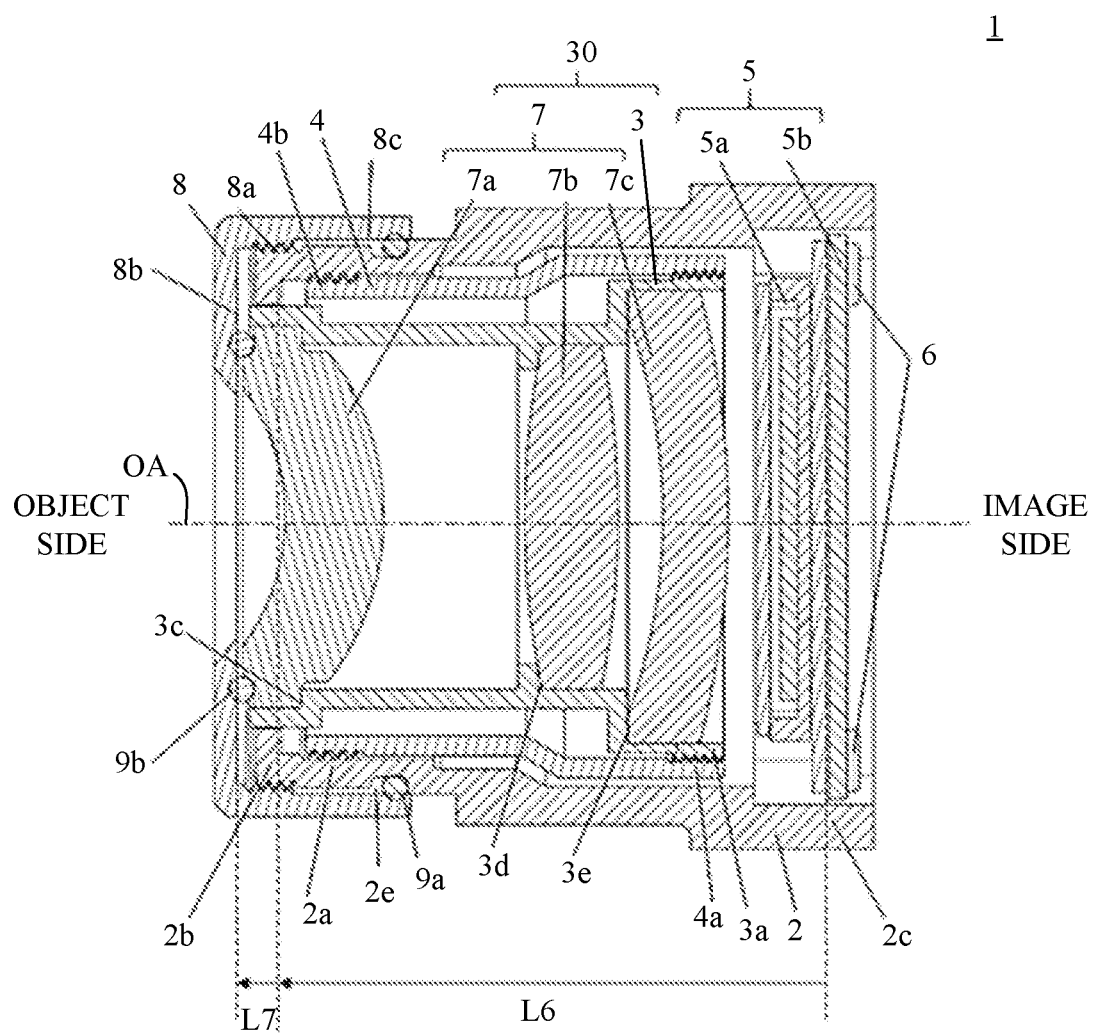
FIG. 3 is a sectional view of the image pickup apparatus according to the first embodiment.

Referring now to FIG. 3, a description will be given of a positional change amount of the contact surface 8b of the press ring 8 in the optical axis direction caused by the temperature change in the image pickup apparatus 1 according to this embodiment. FIG. 3 is a sectional view of the image pickup apparatus 1. In a case where the positional change amount of the contact surface 8b of the press ring 8 in the optical axis direction caused by the temperature change is small, a change amount of the crush amount of the second elastic body 9b becomes small even if the temperature changes, so that waterproof performance can be maintained. In a case where the sensor unit holding portion 2c of the housing 2 is used as a reference, the positional change amount of the contact surface 8b of the press ring 8 in the optical axis direction caused by the temperature change is calculated by multiplying a temperature change amount by the positional change coefficient expressed by the following expression (2).

$$|L6\times\alpha1+L7\times\alpha4| \qquad (2)$$

where L6 is a distance in the optical axis direction from a position P6 of the sensor unit holding portion 2c of the housing 2 to a screwed portion (connecting position P7) between the press ring 8 and the housing 2, L7 is a distance in the optical axis direction from the screwed portion (connecting position P7) between the press ring 8 and the housing 2 to a position P8 of the contact surface 8b of the press ring 8, and α4 is a thermal expansion coefficient of the press ring 8.

The smaller the value of the expression (2) is, the smaller the positional change amount of the contact surface 8b of the press ring 8 becomes in the optical axis direction caused by the temperature change. For example, the positional change coefficient expressed by the expression (2) may satisfy 0.5 or less (inequality $|L6\times\alpha1+L7\times\alpha4|\leq0.5$ may be satisfied). At this time, the positional change amount of the contact surface 8b of the press ring 8 in the optical axis direction (positional change amount of the first lens 7a in the optical axis direction) caused by a temperature change by 50° C. becomes 25 m or less. Thereby, a change amount of the crush amount of the second elastic body 9b caused by the temperature change becomes also 25 μm or less.

Table 1 illustrates a characteristic of each component in the image pickup apparatus 1 in this embodiment. As illustrated in Table 1, the housing 2 is made of aluminum, and the distance L1 in the optical axis direction from the sensor unit holding portion 2C of the housing 2 to the screwed portion between the housing 2 and the connecting portion 4 is 20 mm. The distance L6 in the optical axis direction from the sensor unit holding portion 2C of the housing 2 to the screwed portion between the press ring 8 and the housing 2 is 21.5 mm.

The connecting portion 4 is made of polycarbonate, and the distance L2 in the optical axis direction from the screwed portion between the housing 2 and the connecting portion 4 to the screwed portion between the connecting portion 4 and the lens frame 3 is 10 mm. The lens frame 3 is made of polycarbonate containing glass fiber, and the distance L3 in the optical axis direction from the screwed portion between the connecting portion 4 and the lens frame 3 to the first lens holding portion 3c of the lens frame 3 is 15 mm. The distance L4 in the optical axis direction from the screwed portion between the connecting portion 4 and the lens frame 3 to the second lens holding portion 3d of the lens frame 3 is 6 mm. The distance L5 in the optical axis direction from the screwed portion between the connecting portion 4 and the lens frame 3 to the third lens holding portion 3e of the lens frame 3 is 2 mm. The press ring 8 is made of aluminum, and the distance L7 in the optical axis direction from the screwed portion between the press ring 8 and the housing 2 to the contact surface 8b of the press ring 8 is 1.5 mm.

TABLE 1

| COMPONENT | MATERIAL | THERMAL EXPANSION COEFFICIENT $\alpha$ [/° C.] | DISTANCE [mm] |
|---|---|---|---|
| HOUSING 2 | ALUMINUM | $\alpha 1: 210 \times 10^{-7}$ | L1: 20 |
|  |  |  | L6: 21.5 |
| CONNECTING PORTION 4 | POLYCARBONATE | $\alpha 2: 700 \times 10^{-7}$ | L2: 10 |
| LENS FRAME 3 | POLYCARBONATE (GLASS FIBER INCLUDED) | $\alpha 3: 250 \times 10^{-7}$ | L3: 15 |
|  |  |  | L4: 6 |
|  |  |  | L5: 2 |
| PRESSING RING 8 | ALUMINUM | $\alpha 1: 210 \times 10^{-7}$ | L7: 1.5 |

The positional change coefficient of the first lens 7a in the optical axis direction in a case where the temperature changes is $|L1\times\alpha 1+L3\times\alpha 3-L2\times\alpha 2|=0.095$, and the positional change amount of the first lens 7a in the optical axis direction caused by a temperature change by 50° C. is 4.75 µm. The positional change amount of the crush amount of the second elastic body 9b caused by the temperature change by 50° C. becomes also 4.75 µm or less.

Similarly, the positional change coefficient of the second lens 7b in the optical axis direction in a case where the temperature changes is $|L1\times\alpha 1+L4\times\alpha 3-L2\times\alpha 2|=0.13$, and the positional change amount of the second lens 7b in the optical axis direction caused by the temperature change by 50° C. is 6.5 µm. The positional change coefficient of the third lens 7c in the optical axis direction in a case where the temperature changes is $|L1\times\alpha 1+L5\times\alpha 3-L2\times\alpha 2|=0.23$, and the positional change amount of the third lens 7c in the optical axis direction caused by the temperature change by 50° C. is 11.5 µm. Hence, the first lens 7a has a smaller positional change amount in the optical axis direction than that of each of the second lens 7b and the third lens 7c from the sensor unit holding portion 2c as a reference in a case where the temperature changes.

The positional change coefficient of the contact surface 8b of the press ring 8 in the optical axis direction in a case where the temperature changes is $|L6\times\alpha 1+L7\times\alpha 4|=0.483$, and the positional change amount of the contact surface 8b of the press ring 8 in the optical axis direction caused by the temperature change by 50° C. is 24.15 µm. Thereby, a change amount of the crush amount of the second elastic body 9b caused by the temperature change becomes also 24.15 µm or less.

Second Embodiment

Figure 4:
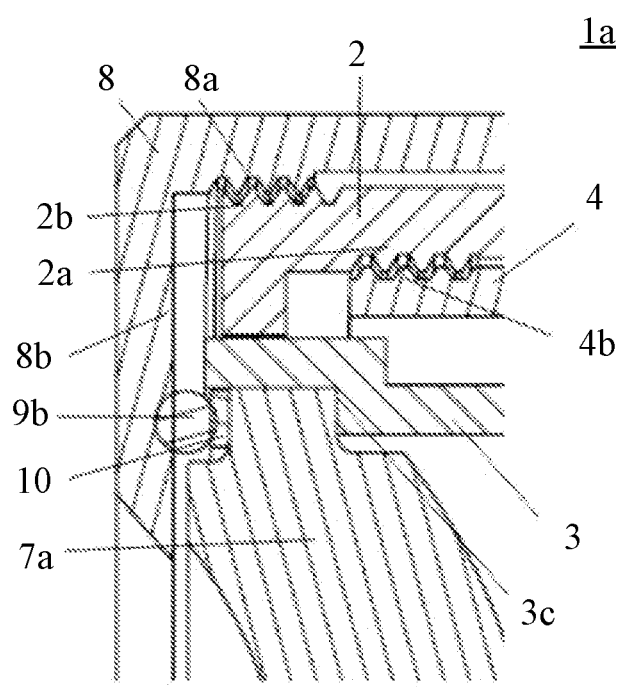
FIG. 4 is an enlarged sectional view of an image pickup apparatus according to a second embodiment.

Referring now to FIG. 4, a description will be given of an image pickup apparatus according to a second embodiment of the disclosure. FIG. 4 is an enlarged sectional view of the image pickup apparatus 1a according to this embodiment. In this embodiment, a correction member 10 is disposed between the first lens 7a and the second elastic body 9b. The correction member 10 is sandwiched between the first lens 7a and the second elastic body 9b. The correction member 10 has an annular shape and contacts the first lens 7a in a whole circumference around the optical axis OA as a center. The correction member 10 changes its thickness in the optical axis direction due to thermal expansion caused by temperature changes. Therefore, the change amount of the crush amount of the second elastic body 9b caused by the temperature change can be further reduced regardless of the change in the position of the first lens 7a in the optical axis direction. This structure can maintain waterproof performance even in a case where the temperature changes. The correction member 10 may be disposed between the contact surface 8b of the press ring 8 and the second elastic body 9b.

Each embodiment can provide an image pickup apparatus that can suppress focus position shift caused by temperature change and secure waterproof performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-205128, filed on Dec. 17, 2021, which is hereby incorporated by reference herein in its entirety.

What is claimed is:

1. An image pickup apparatus comprising:
   a sensor unit including an image sensor;
   a lens unit including a plurality of lenses and a lens frame that holds the plurality of lenses;
   a housing configured to hold the sensor unit and the lens unit;
   a connecting member configured to connect the lens frame and the housing;
   a cover member configured to cover part of a first lens disposed furthest to the image sensor among the plurality of lenses; and
   an elastic member disposed between the first lens and the cover member,
   wherein a thermal expansion coefficient of the connecting member is larger than a thermal expansion coefficient of each of the housing and the lens frame,
   wherein the lens frame includes a first lens holding portion configured to hold the first lens, and
   wherein a connecting position between the connecting member and the lens frame is disposed on the image sensor side of each of a connecting position between the housing and the connecting member and a position of the first lens holding portion.

2. The image pickup apparatus according to claim 1, wherein the housing includes a sensor unit holding portion configured to hold the sensor unit, and
   wherein in a case where temperature changes, a positional change amount of the first lens in an optical axis direction of the lens unit from a position of the sensor unit holding portion as a reference is smaller than a positional change amount of at least one of the plurality of lenses excluding the first lens in the optical axis direction.

3. The image pickup apparatus according to claim 2, wherein the following inequality is satisfied:

$$|L1\times\alpha 1+L3\times\alpha 3-L2\times\alpha 2|\leq 0.1$$

where L1 is a distance in the optical axis direction from the position of the sensor unit holding portion to the connecting position between the housing and the connecting member, L2 is a distance in the optical axis direction from the connecting position between the connecting member and the lens frame to the connecting position between the housing and the connecting member, L3 is a distance in the optical axis direction from the connecting position between the connecting member and the lens frame to the position of the first lens holding portion of the lens frame, $\alpha 1$ is a thermal expansion coefficient of the housing, $\alpha 2$ is a thermal expansion coefficient of the connecting member, and $\alpha 3$ is a thermal expansion coefficient of the lens frame.

4. The image pickup apparatus according to claim 2, wherein the following inequality is satisfied:

$$|L6 \times \alpha 1 + L7 \times \alpha 4| \leq 0.5$$

where L6 is a distance in the optical axis direction from the position of the sensor unit holding portion to a connecting position between the cover member and the housing, L7 is a distance in the optical axis direction from the connecting position between the cover member and the housing to a position of a contact surface of the cover member, $\alpha 1$ is a thermal expansion coefficient of the housing, and $\alpha 4$ is a thermal expansion coefficient of the cover member.

5. The image pickup apparatus according to claim 1, wherein a ratio of a positional change amount of the first lens in an optical axis direction to a positional change amount of an imaging position in the optical axis direction is 0.5 or less.

6. The image pickup apparatus according to claim 1, wherein the elastic member has an annular shape and contacts the first lens in a whole circumference around an optical axis as a center.

* * * * *